(12) United States Patent
Fushiki et al.

(10) Patent No.: US 6,937,757 B2
(45) Date of Patent: Aug. 30, 2005

(54) IMPLEMENTATION AND USES OF XSRGB

(75) Inventors: Ikko Fushiki, Sunnyvale, CA (US); Hock San Lee, Sammamish, WA (US); J. Andrew Goossen, Issaquah, WA (US); Gary K. Starkweather, Bellevue, WA (US); Michael D. Stokes, Eagle, ID (US)

(73) Assignee: Microsoft Corporation, Redmond, WA (US)

(*) Notice: Subject to any disclaimer, the term of this patent is extended or adjusted under 35 U.S.C. 154(b) by 20 days.

(21) Appl. No.: 10/804,162

(22) Filed: Mar. 19, 2004

(65) Prior Publication Data
US 2004/0174377 A1 Sep. 9, 2004

Related U.S. Application Data

(62) Division of application No. 09/631,285, filed on Aug. 3, 2000, now Pat. No. 6,748,107.
(60) Provisional application No. 60/147,325, filed on Aug. 5, 1999.

(51) Int. Cl.[7] .................................................. G06K 9/00
(52) U.S. Cl. ...................................................... 382/162
(58) Field of Search ................................ 382/162, 305; 708/510, 513; 709/214, 246; 710/26, 65; 707/7, 100, 204, 523

(56) References Cited

U.S. PATENT DOCUMENTS

| | | | |
|---|---|---|---|
| 4,533,952 A | * 8/1985 | Norman, III | 348/580 |
| 4,649,470 A | * 3/1987 | Bernstein et al. | 710/15 |
| 4,855,934 A | 8/1989 | Robinson | |
| 5,224,178 A | 6/1993 | Madden et al. | |
| 5,631,859 A | * 5/1997 | Markstein et al. | 708/513 |
| 5,696,892 A | 12/1997 | Redmann et al. | |
| 5,761,105 A | * 6/1998 | Goddard et al. | 708/510 |
| 5,886,701 A | 3/1999 | Chauvin et al. | |
| 5,977,977 A | 11/1999 | Kajiya et al. | |
| 6,005,582 A | 12/1999 | Gabriel et al. | |
| 6,122,721 A | * 9/2000 | Goddard et al. | 712/23 |
| 6,411,294 B1 | 6/2002 | Furuhashi et al. | |
| 6,487,308 B1 | * 11/2002 | Ulichney et al. | 382/162 |
| 6,642,962 B1 | * 11/2003 | Lin et al. | 348/252 |
| 6,795,868 B1 | * 9/2004 | Dingman et al. | 709/246 |
| 2004/0126010 A1 | * 7/2004 | Yamazoe | 382/162 |

OTHER PUBLICATIONS

US 6,336,289, 4/2002, Johns (withdrawn)

* cited by examiner

*Primary Examiner*—Andrew W. Johns
*Assistant Examiner*—Amir Alavi
(74) *Attorney, Agent, or Firm*—Banner & Witcoff, Ltd.

(57) ABSTRACT

An extended colorspace which has a higher accuracy and a wider gamut than sRGB color space is disclosed. The extended color space includes an alpha channel which defines the translucency of the color image. The alpha channel is different from known alpha channels in that the inventive alpha channel can represent "super transparent" and "super opaque" values by allowing the alpha parameter ($\alpha$) to be greater than 1 and less than 0. A data structure for storing the extended colorspace information has three fields, a sign field, an integer field and a decimal field. The sign field defines whether an integer is negative or positive. The integer field defines the integer, wherein the integer defines the super or under saturated values for color and alpha components. The decimal field defines the fine detailed information for the value of the color and alpha components.

18 Claims, 6 Drawing Sheets

| 47-32 | 31-16 | 15-0 |
|---|---|---|
| Red | Green | Blue |

| 63-48 | 47-32 | 31-16 | 15-0 |
|---|---|---|---|
| Alpha | Red | Green | Blue |

IMPLEMENTATION AND USES OF XSRGB

CROSS REFERENCE TO RELATED APPLICATIONS

This application is a divisional application of and claims priority from U.S. application Ser. No. 09/631,285, filed Aug. 3, 2000, now U.S. Pat. No. 6,748,107 which claims priority to provisional application Ser. No. 60/147,325, filed Aug. 5, 1999, both of which are herein incorporated by reference.

TECHNICAL FIELD

The present invention relates to colorspace interchange and more particularly, to a new color format that can be used for a reference color frame and for internal color space for image processing.

BACKGROUND OF THE INVENTION

Communication of color information between different devices and industries has become recognized as an important issue. Each industry generally has its own color management history, with its own terminology standards and methods for communicating color information. As more users are connecting different peripheral devices made by different companies and, in addition, communicate with one another over the Internet, it is becoming more urgent to have a standardized color data management scheme that provides consistent color data management. Many different practices and standards are currently being used.

Different phosphor sets are being used to provide the colors of "red", "green", and "blue". For example, where a monitor may illustrate a pink color, and the user selects the pink color, the printer printing the selection may print out an ugly purple/lavender. This, different values on chromaticity diagrams represent a same color, providing confusion. Tone reproduction of various systems also differs. Also, viewing conditions may vary, causing colors to appear different to different observers. Thus, due to differing visual conditions, the color of the illuminant (the white point), the absolute level of the scene irradiance (generally the illuminance), the surrounding colors, etc., all affect the color perception unless the initial and final conditions are identical. Unless a white point and illuminance level are the same, the color interchange data may not be identical.

Previous color data conversion methods have required the use of cube root computation or raising values to the third power. To store data, every pixel had to be converted using a set of power function routines. This process is time-consuming, consumes processing power, and may introduce errors. Other techniques, such as is described in U.S. Pat. No. 5,224,178, by Madden et al., provide for compressing digital code values to provide a set of reduced range digital codes of a same resolution, but having a smaller range of basic image content values than the dynamic range of the digitized image data base.

As shown in FIG. 1 the chromaticity diagram has been developed by the Commission Internationale de l'Eclairage (CIE), or International Commission on Illumination, to provide a common chromaticity value for colors. The displayable colors by a laser device are shown as a triangle ABC, with points A 102, B 104, and C 106. Ideally, color values for a device should cover a triangle having an area that extends over the entire visible range. However, as shown in FIG. 2, the triangle covered for color values of a Canon CLC500 color copier/printer 202 is shown along with the old RGB color values (Genl. RGB) 204, the first PC color monitors and the sRGB values 206. While some of the cyan colors are limited by sRGB, the brightest greens and reds are output device limited, but not sRGB limited. Clearly, calculations must be used to convert values of the color copier/printer 202 colors to the ordinary CRT colors (sRGB values) 206.

Although lasers have virtually monochromatic output and the primaries of the laser would reside on the spectrum locus of the CIE (International Commission on Illumination) diagram of FIG. 1, showing 2 degree observer data, typically devices do not have the gamut to display the laser colorspace. Thus, data in a laser display colorspace would have to be converted for display and printing.

Cathode display tubes (CRTs), color flat panels (both active and passive matrix types) and high definition televisions (HDTVs) provide chromaticity diagrams that are similar to the CRT model shown in FIG. 2. However, the sRGB chromaticity diagram lacks a range of gamut that includes all colors, and conversion of sRGB color data values is non-linear, thus often resulting in undesired results.

Advanced graphic systems require the features of anti-aliases (removing ragged edges) and blending (translucency) effects. Those effects are handled by an extra component, called the alpha channel, in addition to the RGB components. In order to perform the anti-alias and blending operations correctly with the alpha channel, the linear color components need to be defined in terms of their intensities. Current systems are however limited to the intensity values between 0 and 1, which do not provide optimal results in some circumstances.

SUMMARY OF THE INVENTION

One aspect of the invention relates to an extended colorspace which has a higher accuracy and a wider gamut than sRGB color space. The extended color space includes an alpha channel which defines the translucency of the color image. The alpha channel is different from known alpha channels in that the inventive alpha channel can represent "super transparent" and "super opaque" values by allowing the alpha parameter ($\alpha$) to be greater than 1 and less than 0.

A data structure for storing image information for each component of an image is also disclosed. The data structure has three fields, a sign field, an integer field and a decimal field. The sign field defines whether an integer is negative or positive. The integer field defines the integer, wherein the integer defines the super or under saturated values for color and alpha components. The decimal field defines the fine detailed information for the value of the color and alpha components.

DETAILED DESCRIPTION

Figure 2:
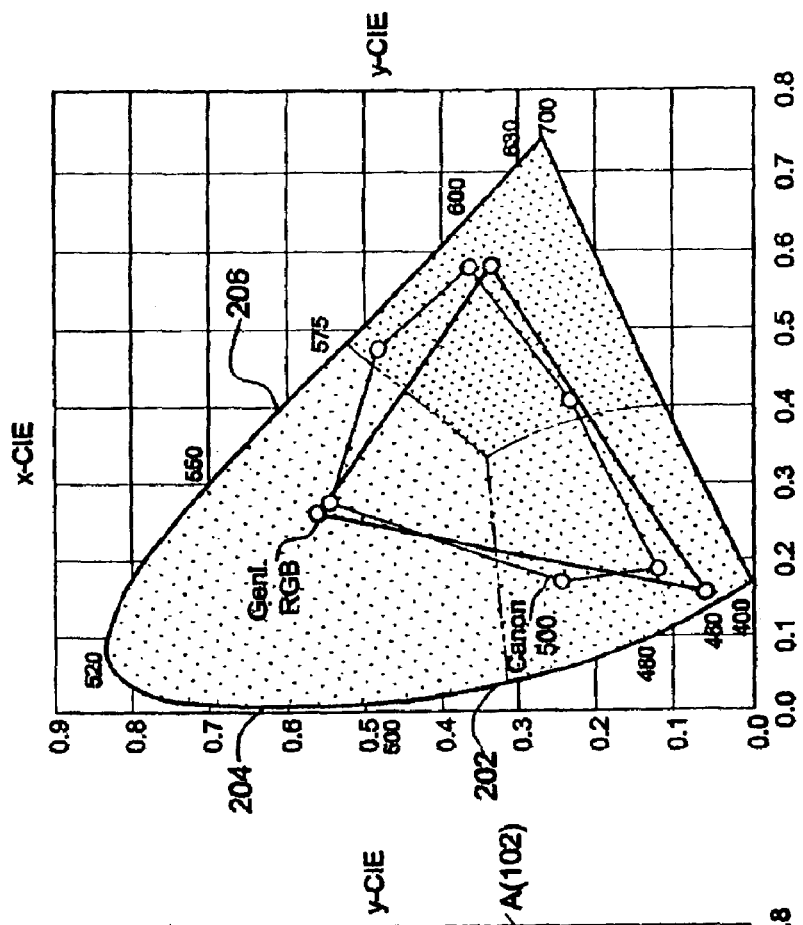
FIG. 2 is a schematic graphical representation of colorspaces for a representative Canon CLC500 color copier/printer, General RGB color values, and sRGB values upon a CIE colorspace diagram as is known in the art.
Figure 1:
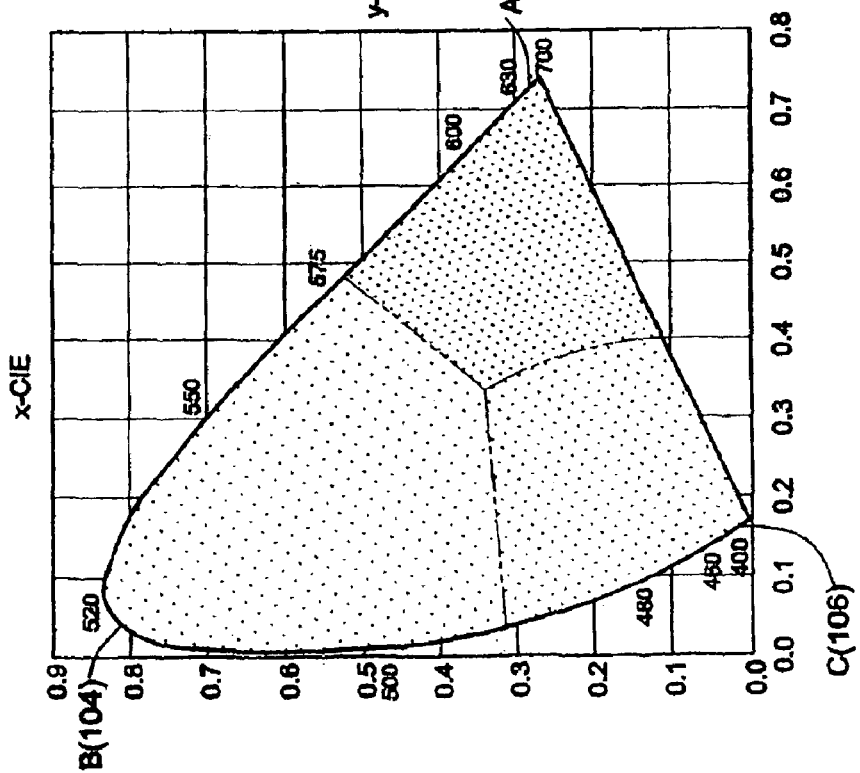
FIG. 1 is a schematic graphical representation of a laser display colorspace upon a CIE colorspace that shows the full gamut of the visual spectrum as is known in the art.
Figure 3:
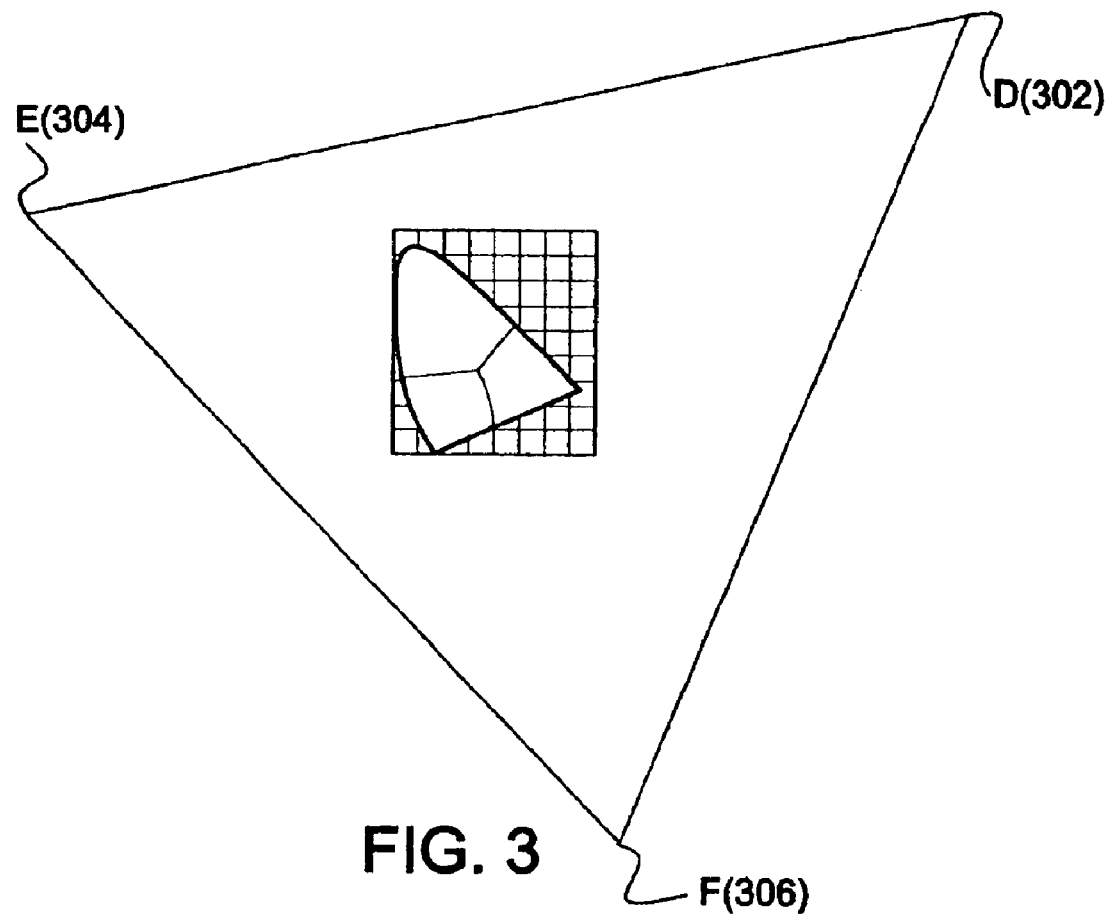
FIG. 3 is a schematic graphical representation of a colorspace in accordance with embodiments of the invention.

As shown in FIG. 3, extending the range of color data values for the chromaticity diagram for sRGB beyond 1.0 and below 0.0 on the x and y axes is illustrated by the triangle DEF 302, 304, 306, so that the present invention provides a chromaticity diagram that encompasses all visible color values. For example, in one embodiment, color data values may be expressed in a signed 16-bit integer (13 bits are used for decimals) with a triangle corresponding to (3.24, −0.97, 0.06), (−1.54, 1.88, −0.20), and (−0.50, 0.04, 1.01), thus covering each component within −4 to 4.

By allowing the component of each primary color to be negative and to extend beyond 1.0 (when normalized to 1.0 in sRGB), the present invention's gamut is larger than the visible color space. The data scheme of the present invention, "XsRGB", is also known as "sRGB64." "XsRGB" will be used hereafter to represent the color data scheme of either XsRGB or sRGB64.

Advanced graphic systems require anti-aliasing features (removing ragged edges) and blending (translucency) effects. To achieve these anti-aliasing features and blending effects, an extra component called an "alpha channel" was introduced. To utilize the alpha channel, the linear color components must be expressed in terms of their intensities. However, sRGB and other color management systems typically store color data values in non-linear 8-bit values per channel. The non-linearity is expressed as a "gamma value". For example, Microsoft's and Apple's color management systems are 2.2 and 1.8, respectively. When only 8 bits were available for color data value representation, it was necessary to convert the color data non-linearly. Otherwise, it created a large gap in the lower intensity values and causing the resulting images to show contours. However, when the size of each component is extended to higher bit (12 bit or higher), the non-linearity requirement is eliminated. Thus, in an embodiment with 12 or more bits for each component, component values do not have to be non-linearized, avoiding confusion of different gamma values in different color standards. When the super luminous or negative values are allowed, color profiles do not require clipping to a narrower gamut. Since, in this embodiment, color values are standardized, standard images may be stored in the XsRGB format without attaching a standardized profile such as an ICC (International Color Consortium) profile to clarify the colors intended. Where desired, an alpha channel may be implemented to store information on transparency. Also, where selected, the color values may be premultiplied by alpha channel values to provide efficient blending.

It is better to define XsRGB more generally by a 4×4 matrix. Also, there is a conversion rule for XsRGB with a different white point.

XsRGB is linear in the visual intensity of each component. Hence, XsRGB can relate linearly to 1931 CIE XYZ values. Let $R_0$, $G_0$, and $B_0$ denote the normalized red, green, and blue components, respectively. Let X, Y, and Z denote 1931 CIE XYZ values, but Y is normalized to 1 instead of 100. The relationship between the normalized XsRGB and XYZ is given by a 4×4 matrix.

$$\begin{pmatrix} R_0 \\ G_0 \\ B_0 \\ 1 \end{pmatrix} = M \begin{pmatrix} X \\ Y \\ Z \\ 1 \end{pmatrix}, \quad (1a)$$

where $$M = \begin{bmatrix} m_{RX} & m_{RY} & m_{RZ} & t_R \\ m_{GX} & m_{GY} & m_{GZ} & t_G \\ m_{BX} & m_{BY} & m_{BZ} & t_B \\ 0 & 0 & 0 & 1 \end{bmatrix} \quad (1b)$$

Only 12 coefficients are needed to define XsRGB. In addition to the rotational part ($m_{RZ}$, etc.), the transitional part ($t_R$, etc.) is used. With this notation, the white point may be addressed as well as the black point. Using the inverse of the above matrix, the reverse relation from XsRGB to CIE XYZ space is given by:

$$\begin{pmatrix} X \\ Y \\ Z \\ 1 \end{pmatrix} = M^{-1} \begin{pmatrix} R_0 \\ G_0 \\ B_0 \\ 1 \end{pmatrix} \quad (2a)$$

where $$M^{-1} = \begin{bmatrix} n_{XR} & n_{XG} & n_{XB} & u_X \\ n_{YR} & n_{YG} & n_{YB} & u_Y \\ n_{ZR} & n_{ZG} & n_{ZB} & u_Z \\ 0 & 0 & 0 & 1 \end{bmatrix} \quad (2b)$$

A 16 bit definition of RGB components is given by:

$$\begin{bmatrix} R_{16} \\ G_{16} \\ B_{16} \end{bmatrix} = 8192 \times \begin{bmatrix} R_0 \\ G_0 \\ B_0 \end{bmatrix} \quad (2c)$$

In equation (2c), no gamma corrections are required since a sufficient number of bits are available to describe the color data (here, 16 bits).

It is desirable for XsRGB to have a simple transform to sRGB in D65. D50 and D65 are the standard illuminans (the spectrum distributions of the light source) defined by CIE. D50 and D65 are the spectrum distributions similar to the Black Body radiation of 5000 and 6500 Kelvin, respectively. Indeed, it is desirable for XsRGB to be identical to sRGB when its value is inside the range of sRGB. From the sRGB specification, the coefficients of Eq. (1b) and Eq. (2b) are determined as:

$$M_{D65} = \begin{bmatrix} 3.2410 & -1.5374 & -0.4986 & 0 \\ -0.9692 & 1.8760 & 0.0416 & 0 \\ 0.0556 & -0.2040 & 1.0570 & 0 \\ 0 & 0 & 0 & 1 \end{bmatrix} \quad (3a)$$

and

-continued $$M_{D65}^{-1} = \begin{bmatrix} 0.4124 & 0.3576 & 0.1805 & 0 \\ 0.2126 & 0.7152 & 0.0722 & 0 \\ 0.0193 & 0.1192 & 0.9505 & 0 \\ 0 & 0 & 0 & 1 \end{bmatrix} \quad (3b)$$

The white point of D65 is $(x_{D65}, y_{D65})=(0.3127, 0.3291)$; the corresponding CIE XYZ values are $$\begin{cases} X_{D65} = x_{D65}/y_{D65} = 0.9502 \\ Y_{D65} = 1.0 \\ Z_{D65} = (1.0 - x_{D65} - y_{D65})/y_{D65} = 1.0887 \end{cases} \quad (4)$$

Note that the Y-value at the white point is 1. When the device has the different white point $(X_w, Y_w, Z_w)$, the CIE XYZ coordinates for the appearance match must be transformed by the scaling matrix.

$$S_w = \begin{bmatrix} X_{D65}/X_w & 0 & 0 & 0 \\ 0 & 1 & 0 & 0 \\ 0 & 0 & Z_{D65}/Z_w & 0 \\ 0 & 0 & 0 & 1 \end{bmatrix} \quad (5a)$$

and its inverse is $$S_w^{-1} = \begin{bmatrix} X_w/X_{D65} & 0 & 0 & 0 \\ 0 & 1 & 0 & 0 \\ 0 & 0 & Z_w/Z_{D65} & 0 \\ 0 & 0 & 0 & 1 \end{bmatrix} \quad (5b)$$

The transformation matrix from XYZ to XsRGB at this white point is given by $$M_w = M_{D65} S_w \quad (6a)$$

and its transverse matrix is given by $$M_w^{-1} = S_w^{-1} M_{D65}^{-1} \quad (6b)$$

For an example, the white point of D50 is $(x_{D50}, y_{D50})=(0.3457, 0.3585)$. The corresponding CIE XYZ value is $(X_{D50}, Y_{D50}, Z_{D50})=(0.9643, 1, 0.8251)$. Hence the scaling matrices are $$S_{D50} = \begin{bmatrix} 0.9854 & 0 & 0 & 0 \\ 0 & 1.0 & 0 & 0 \\ 0 & 0 & 1.3195 & 0 \\ 0 & 0 & 0 & 1 \end{bmatrix} \quad (7a)$$

and $$S_{D50}^{-1} = \begin{bmatrix} 1.0148 & 0 & 0 & 0 \\ 0 & 1.0 & 0 & 0 \\ 0 & 0 & 0.7579 & 0 \\ 0 & 0 & 0 & 1 \end{bmatrix} \quad (7b)$$

The resultant transformation matrices for D50 are:

$$M_{D50} = \begin{bmatrix} 3.1937 & -1.5374 & -0.6579 & 0 \\ -0.9550 & 1.8760 & 0.0549 & 0 \\ 0.0548 & -0.2040 & 1.3947 & 0 \\ 0 & 0 & 0 & 1 \end{bmatrix} \quad (8a)$$

and $$M_{D50}^{-1} = \begin{bmatrix} 0.4185 & 0.3629 & 0.1832 & 0 \\ 0.2126 & 0.7152 & 0.0722 & 0 \\ 0.0146 & 0.0903 & 0.7204 & 0 \\ 0 & 0 & 0 & 1 \end{bmatrix} \quad (8b)$$

The appearance match is obtained if the XsRGB values are calculated from the conversion matrix of the device white point. The absolute match may be obtained if the conversion matrix of D65 is used irrespective of the device white point.

Let $(R_w, G_w, B_w)$ denote the normalized RGB value obtained with the matrix $M_w$ defined in Eq. (6a) for the specific white point. The $(R_w, G_w, B_w)$ value is used to do the appearance match and is called the appearance RGB value. When the absolute match is needed, the RGB values $(R_0, G_0, B_0)$ are used by using the matrix $M_{D65}$ defined in Eq. (3a), which is called the absolute RGB value. The absolute RGB value is obtained from the appearance RGB value by the following equation:

$$\begin{pmatrix} R_0 \\ G_0 \\ B_0 \\ 1 \end{pmatrix} = M_{D65} S_w^{-1} M_{D65}^{-1} \begin{pmatrix} R_w \\ G_w \\ Z_w \\ 1 \end{pmatrix} \quad (9a)$$

The reverse relation is obtained as:

$$\begin{pmatrix} R_w \\ G_w \\ B_w \\ 1 \end{pmatrix} = M_{D65} S_w M_{D65}^{-1} \begin{pmatrix} R_0 \\ G_0 \\ Z_0 \\ 1 \end{pmatrix} \quad (9b)$$

Since the XsRGB space is directly linked to CIE XYZ space, it is possible to produce the XsRGB measuring device. The new XsRGB device may be produced by adding the matrix conversion routines to the existing colorimeters. XsRGB values may be measured directly from the device. The device may produce the appearance RGB values and the absolute RGB values.

The default XsRGB space is the case of D65 that is linked to sRGB. Since there is no translational part, Eq. (1a) with $M=M_{D65}$ can be written with a 3×3 matrix as:

$$\begin{pmatrix} R_0 \\ G_0 \\ B_0 \end{pmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{pmatrix} X \\ Y \\ Z \end{pmatrix} \quad (10)$$

Allowing each component to go from −4 to 4 by X, Y, Z values, wherein X, Y, and Z denote 1931 CIE XYZ values wherein Y has been normalized to 1 instead of 100, covers a range larger than the range covered by XYZ. The equation (10) provides one embodiment of a floating point format for XsRGB. When the 16 bit version of XsRGB is utilized, a signed 16 bit integer is used and 8192 ($=2^{13}$) is interpreted as 1 in the normalized value. Hence, the lowest 13 bits are used for the decimal portion.

Conversion from 16 bit color data for the XsRGB format to an 8 bit sRGB format is as follows: Let $C_{16}$ and $C_8$ denote one of the components in 16 bit XsRGB format and 8 bit sRGB format, respectively. The relationships are:

$C_0 = C_{16}/8192$ (Corresponding to the normalized linear XsRGB)

$C_8 = 0$ for $C_{16} < 0$ $C_8 = 12.92 \times C_0 \times 255$ for $0 \leq C_0 < 0.00304$ ($0 \leq C_{16} \leq 24$)

$C_8 = (1.055 \times C_0^{(1.0/2.4)} - 0.055) \times 255$ for $0.00304 \leq C_0 < 1$ ($25 \leq C_{16} < 8192$)

$C_8 = 255$ for $C_0 \geq 1$ ($C_{16} \geq 8192$)  (11)

The above conversions correspond to clipping below 0 and above 8192 of the 16 bit XsRGB when converting to 8 bit sRGB. The clipping routine may be further modified as desired.

The reverse relationships are:

$C_{16} = 2.4865 \times C_8$ for $0 \leq C_8 \leq 10$ $C_{16} = 8.192 \times [(C_8 + 14.025)/269.025]^{2.4}$ for $11 \leq C_8 \leq 255$.  (12)

The extension of sRGB in accordance with the present invention provides a number of advantages. For example, blending operations with an alpha channel may be directly applied to XsRGB since XsRGB is linear. The XsRGB profiles may easily be obtained from the CIE XYZ profiles. When XsRGB is used for color reference, there is no need to rotate color components to display each component in an 8 bit sRGB device. Only gamma correction described in (Eq. 12) above need be used to convert to 8 bit sRGB. Even without an exact calibration, XsRGB yields satisfactory conversion for output for color monitors. The scanned images may generally be stored in XsRGB format without losing bit depths since most scanners produce data in not more than 12 bits in each color component.

Figure 4:
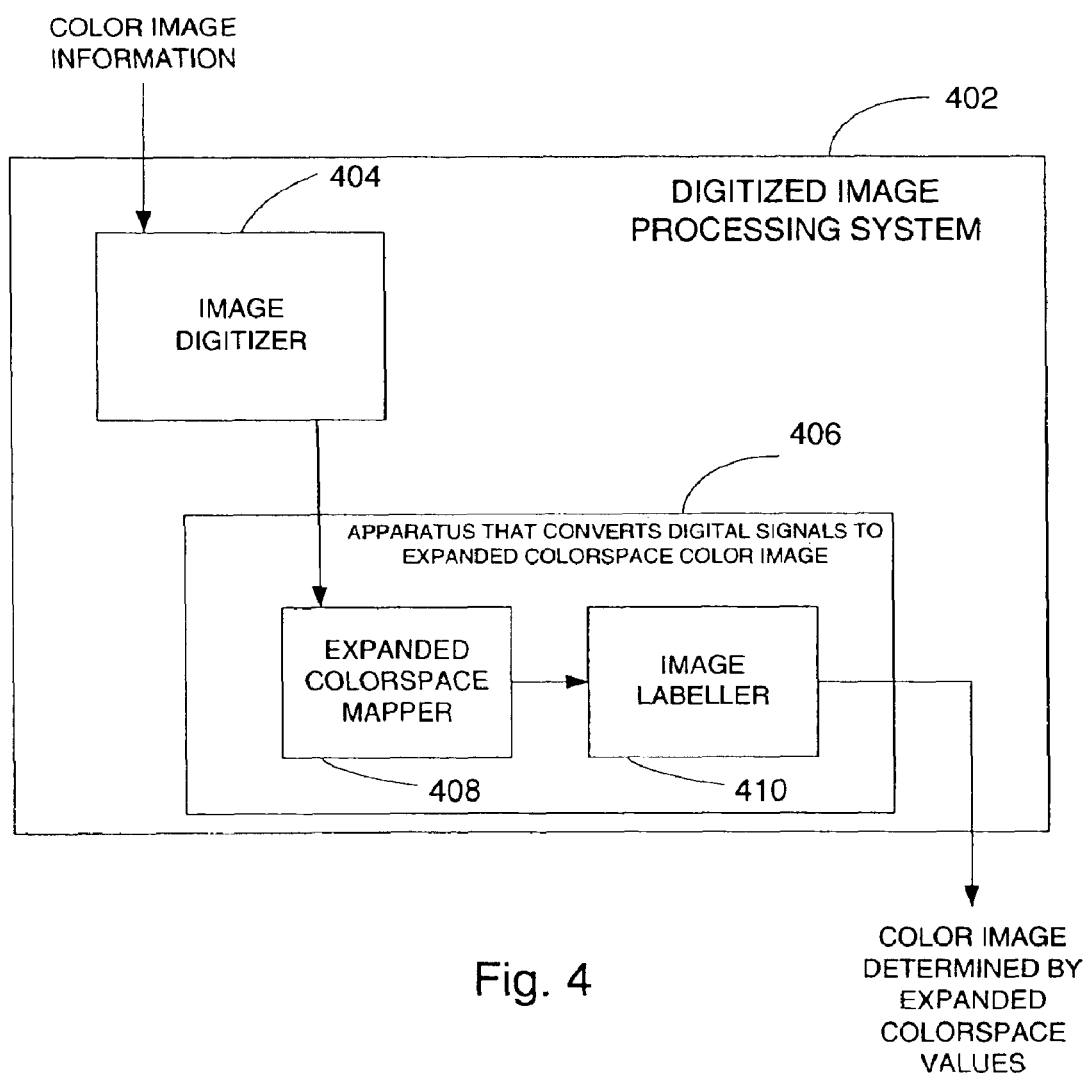
FIG. 4 is a block diagram of an apparatus in a digitized image processing system for converting color images in accordance with embodiments of the invention.

FIG. 4 is a block diagram of one embodiment of an apparatus in a digitized image processing system for converting color images in accordance with the present invention. In the digitized image processing system 402, an image digitizer 404 that utilizes color image information to output digital signals representing a color image to the apparatus 406 that converts the digital signals to a high quality error-free expanded colorspace color image. The apparatus 406 includes: an expanded colorspace mapper 408, for mapping the digital signals to expanded colorspace values wherein the expanded colorspace values include values beyond a visible range of color values; and an image labeller 410, coupled to the expanded colorspace mapper 408, for labeling an image determined by expanded colorspace values as an expanded colorspace image. The expanded colorspace may include a colorspace defined by a chromaticity diagram that extends into negative component values and beyond 1.0 when normalized to 1.0 in sRGB. The expanded colorspace mapper may utilize multiplication of $R_0$, $G_0$, $B_0$ values by a predetermined matrix to map the color values to an expanded colorspace. The $R_0$, $G_0$, $B_0$ values may be obtained using equation (9). Where desired, the color data values and their bit components, clipping, transparency information storage and premultiplication and normalization of color data values may be as described for the methods above.

Color operations defined in the RGB/ARGB colorspace may be extended to the expanded RGB/ARGB colorspace. Three examples of color operations in the expanded RGB/ARGB colorspace include:

1. Interpolation between two RGB colors $X=(R_x, G_x, B_x)$ and $Y=(R_y, G_y, B_y)$. The RGB color $Z=(R_z, G_z, B_z)$ that is linearly interpolated between X and Y is given by:

$R_z = (1-d)R_x + dR_y$ $G_z = (1-d)G_x + dG_y$ $B_z = (1-d)B_x + dB_y$ where d is the normalized distance of Z from X to Y, and d=0 at X and d=1 at Y.

2. Digital image composition operations that combine two non-premultiplied RGBA colors. For example, one of the operations, X over Y, where $X=(A_x, R_x, G_x, B_x)$ and $Y=(A_y, R_y, G_y, B_y)$, produces color $Z=(A_z, R_z, G_z, B_z)$. The formula is given by:

$R_z = A_x R_x + (1-A_x) R_y$ $G_z = A_x G_x + (1-A_x) G_y$ $B_z = A_x B_x + (1-A_x) B_y$ $A_z = A_x A_x + (1-A_x) A_y$

Note that this formula does not allow associativity for the order of the operations contrast to the premultiplied ARGB case discussed below.

3. Image convolution operations: For example, a blur filter matrix M is given by:

$$\begin{bmatrix} 1/16 & 1/8 & 1/16 \\ 1/8 & 1/4 & 1/8 \\ 1/16 & 1/8 & 1/16 \end{bmatrix}$$

The blur equation is for each color component. Assuming a RGB color component of a pixel at location (i,j) is C(i,j), the resulting RGB color component of the pixel after the blur operation is given by:

(1/16)C(i−1, j−1)+(1/8)C(i−1, j)+

(1/16)C(i−1, j+1)+(1/8)C(i,j−1)+

(1/4)C(i,j)+(1/8)C(i,j+1)+(1/16)C (i+1,j−1)+(1/8)C(i+1,j)+(1/16)C(i+1, j+1)

Besides these examples, the illumination and shading used in 3D graphics can be applied XsARGB space.

Figure 5:
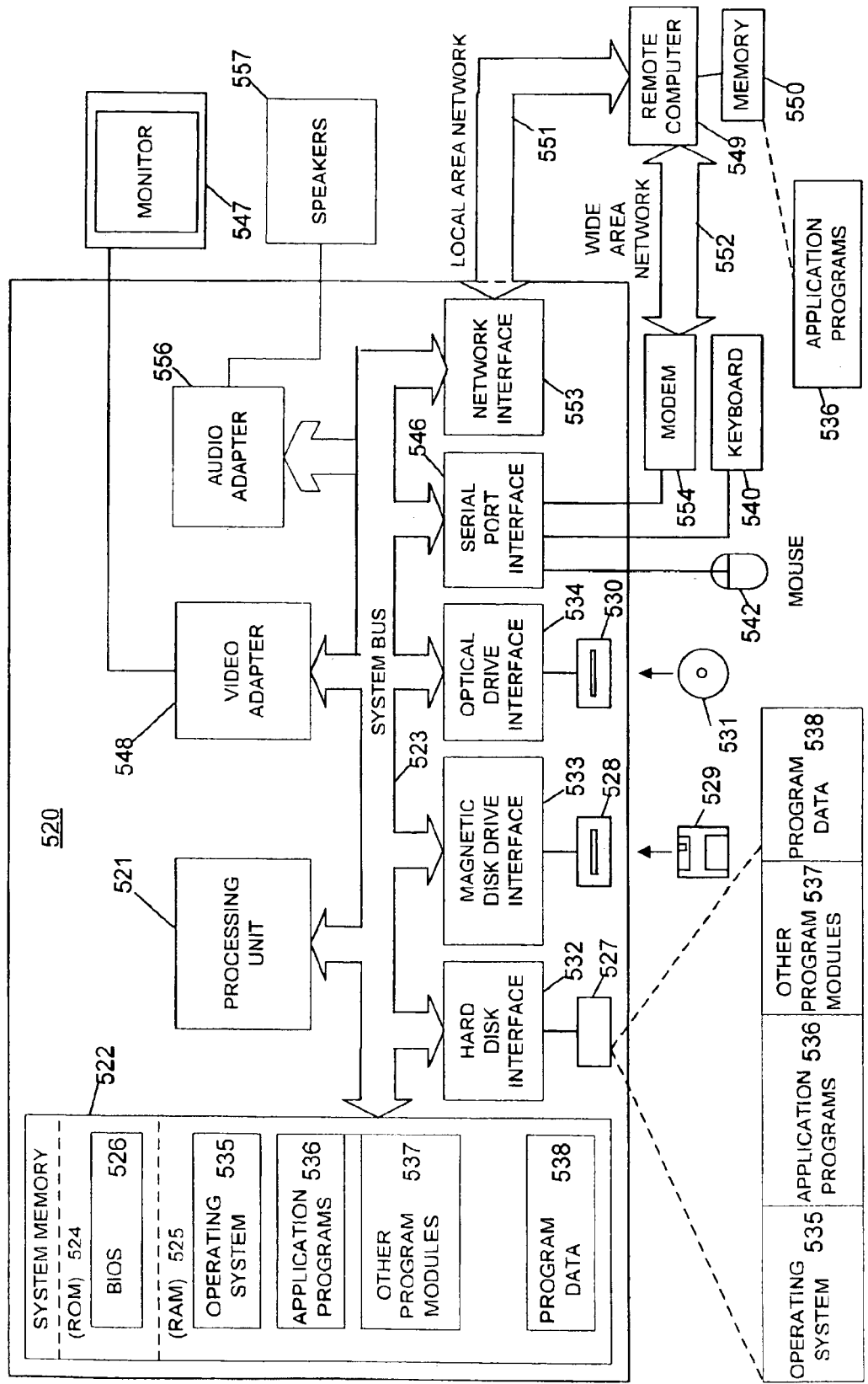
FIG. 5 is a block diagram of a computer system that may be used to implement embodiments of the invention.

With reference to FIG. 5, an exemplary system for implementing the invention includes a general purpose computing device in the form of a conventional personal computer 520, including a processing unit/processor 521, a system memory 522, and a system bus 523 that couples various system components including the system memory to the processing unit/processor 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system 526 (BIOS), containing the basic routines that helps to transfer information between elements within the personal computer 520, such as during start-up, is stored in ROM 524. The personal computer 520 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of computer readable instructions, data structures, program modules and other data for the personal computer 520. Although the exemplary environment described herein employs a hard disk, a removable magnetic disk 529 and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 529, optical disk 531, ROM 524, or RAM 525, including an operating system 535, one or more application programs 536, other program modules 537 and program data 538. A user may enter commands and information into the personal computer 520 through input devices such as a keyboard 540 and pointing device 542. Other input devices (not shown) may include a microphone, joystick, game pad, satellite dish, scanner or the like. These and other input devices are often connected to the processing unit 521 through a serial port interface 546 that is coupled to the system bus, but may be connected by other interfaces, such as a parallel port, game port or a universal serial bus (USB). A monitor 547 or other type of display device is also connected to the system bus 523 via an interface, such as a video adapter 548. In addition to the monitor, personal computers typically include other peripheral output devices (not shown) such as speakers and printers.

The personal computer 520 may operate in a networked environment using logical connections to one or more remote computers, such as a remote computer 549. The remote computer 549 may be another personal computer, a server, a router, a network PC, a peer device or other common network node, and typically includes many or all of the elements described above relative to the personal computer 520, although only a memory storage device 550 has been illustrated in FIG. 5. The logical connections depicted in FIG. 5 include a local area network (LAN) 551 and a wide area network (WAN) 552. Such networking environments are commonplace in offices, enterprise-wide computer networks, intranets and the Internet.

When used in a LAN networking environment, the personal computer 520 is connected to the local network 551 through a network interface or adapter 553. When used in a WAN networking environment, the personal computer 520 typically includes a modem 554 or other means for establishing communications over the wide are network 552, such as the Internet. The modem 554, which may be internal or external, is connected to the system bus 523 via the serial port interface 546. In a networked environment program modules depicted relative to the personal computer 520, or portions thereof, may be stored in the remote memory storage device. It will be appreciated that the network connections shown are exemplary and other means of establishing communications between the computers may be used.

According to one embodiment of the invention, an alpha channel is used to convey transparency information about a color and is referred to as "XsARGB". For XsARGB, an additional 16 bit component is used to store transparency information. First, a normalized alpha channel $A_0$ will be introduced. The values 0 and 1 of $A_0$ are regarded as transparent and opaque, respectively. The four components $(A_0, R_0, G_0, B_0)$ constitutes one color value. If each component is multiplied by 8192 we obtain the XsARGB component $(A_{16}, R_{16}, G_{16}, B_{16})$. This component is called the non-premultiplied XsARGB and $(A_0, R_0, G_0, B_0)$ is called the normalized non-premultiplied XsARGB. The discussion of premultiplied colors will now be discussed.

When an image B is laid on top of an image A, the resultant image P has the pixel value $$p=\beta b+(1-\beta)a, \qquad (14)$$

where a and b are a color component of the images A and B at a certain pixel and $\beta$ is the alpha channel of the image B at that pixel. An image C can be laid on top of the image P to create another image. We want to create the overlay formula so that the final result does not depend on the order (associativity).

$$C\oplus(B\oplus A)=(C\oplus B)\oplus A. \qquad (15)$$

Let D denote the image created by C and B and one of its color components and alpha value d and $\delta$, respectively. The equation (9) for each color component can be written as $$\gamma c+(1-\gamma)[\beta b+(1-\beta)a]=\delta d+(1-\delta)a, \qquad (16)$$

where c and $\gamma$ are one of color components and alpha value of the image C at the pixel of interest. Comparing the coefficients of a, the alpha value of the composited image D must be $$\delta=\beta+\gamma-\gamma\beta. \qquad (17)$$

Comparing the rest of the equation (16), the value of the color component, d, multiplied by its alpha value, $\delta$, are given by $$\delta d=\gamma c+(1-\gamma)\beta b. \qquad (18)$$

Notice that in equation (18) the color components are always multiplied by their alpha values. Hence, it is efficient to work with color components that are already multiplied by their alpha values. Those colors are called premultiplied colors.

When blending operations are processed, it is more efficient to use RGB values which are multiplied by the alpha value. The four components $(A_0, R'_0, G'_0, B'_0)$ where $R'_0=A_0R_0$, $G'_0=A_0G_0$, and $B'_0=A_0B_0$, are called normalized premultiplied XsRGB. By multiplying each component by 8192, the XsARGB component $(A_{16}, R'_{16}, G'_{16}, B'_{16})$ is obtained. This component is called the premultiplied XsARGB.

Figures 6, 7, 8:
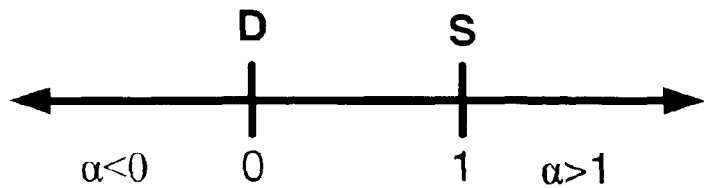
FIG. 6 illustrates the alpha value as an interpolation/extrapolation parameter according to embodiments of the invention.
FIG. 7 illustrates a RGB48 color format according to embodiments of the invention.
FIG. 8 illustrates an ARGB64 color format according to embodiments of the invention.

According to one embodiment of the invention, the alpha value $A_0$ is allowed to go above 1 and below zero. The meaning of the alpha value can be considered in the following way. When a source image, S, is overlaid to the destination image, D the resultant image, D' is obtained, as $$d'=\alpha s+(1-\alpha)d \qquad (19)$$

where s, d, and d' are one of the normalized color components of the image S, D, and D' at the corresponding pixels, respectively, and a is the alpha value of the source image S at the considering pixel. When $\alpha=0$, the resultant image remains the same as the destination image. This case is called transparent. When $\alpha=1$, the resultant image is the same as the source image. This case is called opaque. When α is between 0 and 1, the resultant image is the mixed image between the source and destination images. Usually α is a translucency parameter ranging between transparent (=0) to opaque (=1). However, if equation (12) is studied, it will be noticed that equation (12) is nothing but an interpolation equation. Hence, when α<0 or α>1, equation (12) is very well defined and it is extrapolating the source and destination images. FIG. 6 shows the alpha value as an interpolation/extrapolation parameter. The invention allows α to be smaller than 0 or larger than 1, wherein α< is called "super transparent" and α>1 is called "super opaque."

When a XsRGB (16 bit each component) color is put into a memory, bits 0–15 are the blue component, bits 16–31 are the green component, and bits 32–47 are the red component as illustrated in FIG. 7. Each component is a signed 16 bit integer. The value 8192 is interpreted as 1.0. When it is saved into a file, Intel's Little Endian convention put the first two bytes for the blue component, the next two bytes for the green component, and the subsequent two bytes for the red component. This color format is called RGB48.

Either premultiplied or non-premultiplied, the data structure of XsARGB (16 bit each component) remains the same. When a XsARGB (16 bit each component) color is put into a memory, bits 0–15 are the blue component, bits 16–31 are the green component, bits 32–47 are the red component, and bits 48–63 are the alpha component as illustrated in FIG. 8. Each component is a signed 16 bit integer. The value 8192 is interpreted as 1.0. When it is saved into a file, Intel's Little Endian convention put the first two bytes for the blue component, the next two bytes for the green component, and the subsequent two bytes for the red component, and the last two bytes for the alpha component. This color format is called ARGB64.

When the data is stored linearly, even the 16 bit scale may not be sufficient to store the detailed shades. When more details are required for the certain range of each component, a special range can be assigned in each component. When each component is normalized, the format can allow each component to vary from −4 to +4. However, most values lie within 0 to 1. Special ranges can be assigned in −4 to +3, −3 to −2, 2 to 3, and 3 to 4 to have different scales from the default XsRGB and XsARGB. A user can specify those ranges and define it in the image header. Hence XsRGB and XsARGB can contain multi-color resolution data.

The variation of color format for lower bit depths can be defined. The possible formats are as follows:
32 bit XsRGB—10 bit in each component (8 bit decimal field) and 2 bit extra.
36 bit XsRGB—12 bit each component (10 bit decimal field).
40 bit XsRGB—13 bit each component (11 bit decimal field) and 1 bit extra.
40 bit XsARGB—10 bit each component (8 bit decimal field).
48 bit XsARGB—12 bit each component (10 bit decimal field).

Figure 9:
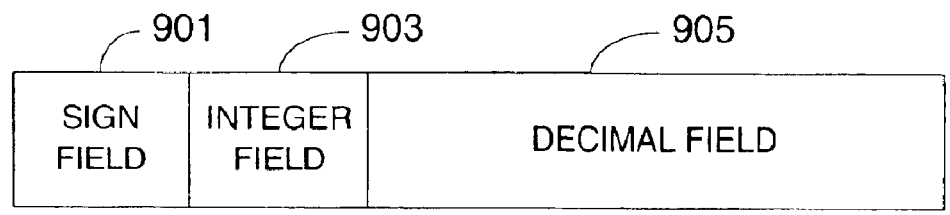
FIG. 9 illustrates a data structure for storing image information for each color component according to embodiments of the invention.
Figure 10A:
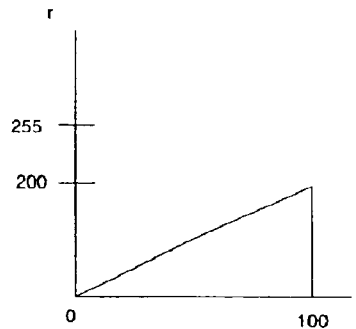
FIGS. 10(a)–10(e) illustrate various stages of color data according to embodiments of the invention.
Figure 10D:
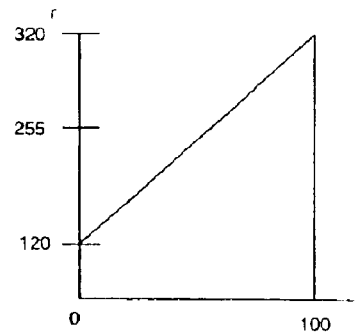
Figure 10B:
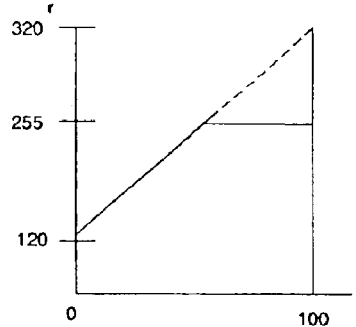
Figure 10E:
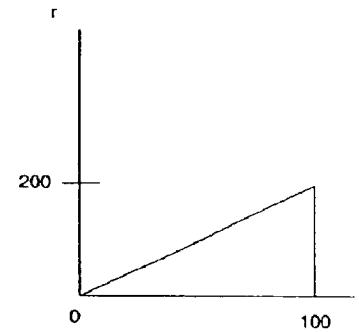
Figure 10C:
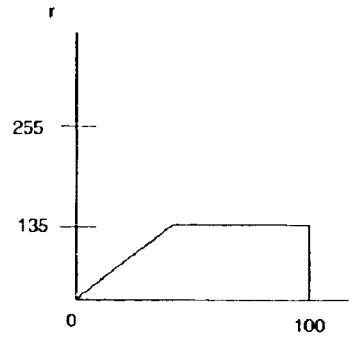

As illustrated in FIG. 9, the data structure for storing image information for each color component of the image is divided into several fields. The first field is a one bit sign field 901 for defining whether an integer value representing the bound of colorspace is positive or negative. The second field is the integer field 903. The integer field defines the value of the bounds of the colorspace. The integer field comprises at least one bit. If the integer field comprises one bit, the integer can be equal to one of two integer values. If the integer field comprises two bits, the integer can be equal to one of four possible integer values. The third field is a decimal field 905 which defines color data information regarding the color value of the component. The more bits that the decimal field contains, the greater the number of color values the component can be assigned. For example, if the decimal field comprises 9 bits, the color values can range from 0 to 511, and if the decimal field comprises 10 bits, the color values can range between 0 and 1023. Thus, there is a tradeoff between how many bits to allot to the integer field and the decimal field.

In addition to the higher accuracies, RGB48 and ARGB64 have the extra ranges below 0 and beyond 1 (in terms of the normalized values). This gives significant advantages in images filtering. For example, suppose a series of filters, $f_1$, $f_2$, ..., $f_n$ is applied. In each filter, the component value may go below 0 or go above 1. If the color value is truncated in each filter, the correct result may not be obtained in the end. For an example, $$\begin{cases} f_1(x) = x - 0.5 \\ f_2(x) = x + 0.5 \end{cases} \quad (20)$$

The correct result of $f_2 \circ f_1(x) = f_2(f_1(x))$ should be x itself. However, $f_1$ is truncated between 0 and 1, the result of $f_2 \circ f_1(x)$ becomes 0.5 for all x<0.5.

The existing image format forces the resultant image to be clipped in each filter. Hence, the final result is likely to be incorrect. This will cause artifacts to appear in the image. With the excess range in the color space of the invention, the intermediate results are not clipped. Only the final result is clipped to the range of the output device. To further illustrate this point, FIG. 10(*a*) illustrates the color data for a red component which has a peak value of 200. If the red component is shifted by some operation by 120, some of the color data will be greater than 255. The color data which has a value greater than 255 is clipped to equal 255 as illustrated in FIG. 10(*b*). If the red component is then shifted back to its original position, the peak values of the red component are now only equal to 135 as illustrated in FIG. 10(*c*). However, according to one embodiment of the invention, where the color space is not limited to 0 to 255, the color data greater than 255 is not lost or clipped when the red component is shifted by 120 as illustrated in FIG. 10(*d*). Since the peak values are not lost using the invention, when the red component is shifted back, all of the original information still remains as illustrated in FIG. 10(*e*).

Another clipping example is cubic interpolation. It simulates the sync function and the interpolated value can be negative. The RGB48 and ARGB64 formats can store those negative values without clipping.

In general, the intermediate space is made as large as possible up to complex numbers. Quantum mechanics uses complex numbers to calculate the wave function. However, the final observable result is expressed as the absolute value of the wave function as the probability. Unless the complex numbers are kept in the intermediate state, the correct results cannot be obtained. The RGB48 and ARGB64 formats are aimed at this direction so that the intermediate states can have very wide range. The general Fourier transform produces the complex numbers. However, cosine or sine transforms are usually used to produce the real numbers. The RGB48 or ARGB64 format can be used to store the convoluted coefficients of sine or cosine transform which require the signed numbers.

In general, n-dimensional variables $\xi_1, \xi_2, \ldots, \xi_n$ can be stored in the consecutive slots in the RGB48 and ARGB64.

Then, the general transform for each variable can be applied.

$$F(\omega_1, \ldots, \omega_n) = \int d\xi_1 \ldots \int d\xi_n g(\omega_1, \ldots \omega_n; \xi_1, \ldots, \xi_n) f(\xi_1, \ldots, \xi_n) \quad (21a)$$

If there are inverse transforms, the inverse transformation can be written by $$F(\xi_1, \ldots, \xi_n) = \int d\omega_1 \int d\omega_n G(\xi_n; \omega_1, \ldots, \omega_n) F(\omega_1, \ldots, \omega_n) \quad (21b)$$

In both cases, the integral can be replaced with the summation, $\Sigma$, if the considering variable is discrete. The examples of those transforms are Fourier transform, (discrete) Cosine and Sine transforms, Laplace transforms, etc. In addition, box filters and other filters can also be used.

When the variable is a complex number, it can be saved in two components, one for the real part and the other for the imaginary part. The above equations can be used for the complex number and saved in the RGB48 and ARGB64 formats as well as in their variation forms.

JPEG compression uses DCT (Discrete Cosine Transform), quantization, and Huffman encoding. In the lossy mode, either DCT or quatization is used. Since all of the above algorithms are well defined in negative numbers, JPEG compression algorithms can be used to compress RGB48 and ARGB64 images. Since those image formats are not defined in JPEG itself, the encoder and decoder need to be modified to be able to handle them.

Although the invention has been described in connection with the preferred embodiments, it will be understood by those skilled in the art that many modifications can be made thereto within the scope of the claims which follow. Accordingly, it is not intended that the scope of the invention be limited by the above description, but that it be determined by reference to the claims that follow.

What is claimed is:

1. A computer-readable medium having stored thereon a data structure for storing image information for each component of an image, said data structure comprising:
    a sign field for defining whether an integer is positive or negative;
    an integer field for defining said integer, wherein said integer defines a super or under saturated value for the components;
    a decimal field for defining fine detail information of the color components.

2. The data structure according to claim 1, wherein the integer field comprises one bit for defining two integer values.

3. The data structure according to claim 2, wherein said two integer values are 0 and 1.

4. The data structure according to claim 1, wherein the integer field comprise two bits for defining four integer values.

5. The data structure according to claim 1, wherein the data structure is used to store images which are 32 bit XsRGB formatted.

6. The data structure according to claim 1, wherein the data structure is used to store images which are 36 bit XsRGB formatted.

7. The data structure according to claim 1, wherein the data structure is used to store images which are 40 bit XsRGB formatted.

8. The data structure according to claim 1, wherein said decimal field comprises 9 bits and said fine detailed information has 512 levels.

9. The data structure according to claim 1, wherein said decimal field comprises 10 bits and said fine detailed information has 1024 levels.

10. The data structure according to claim 1, wherein said decimal field comprises 11 bits and said fine detailed information has 2048 levels.

11. A computer readable medium having stored thereon a data structure for storing image information for each component of an image, said data structure comprising:
    a sign field for defining whether an integer is negative or positive;
    an integer field for defining said integer, wherein said integer defines a super or under saturated value for the color and alpha components;
    a decimal field for defining fine detailed information of the color and alpha components.

12. The data structure according to claim 11, wherein the integer field comprises one bit for defining two integer values.

13. The data structure according to claim 12, wherein said two integer values are 0 and 1.

14. The data structure according to claim 11, wherein the integer field comprise two bits for defining four integer values.

15. The data structure according to claim 11, wherein the data structure is used to store images which are 40 bit XsARGB formatted.

16. The data structure according to claim 11, wherein the data structure is used to store images which are 48 bit XsARGB formatted.

17. The data structure according to claim 11, wherein said decimal field comprises 9 bits and said fine detailed information has 512 levels.

18. The data structure according to claim 11, wherein said decimal field comprises 10 bits and said fine detailed information has 1024 levels.

* * * * *

UNITED STATES PATENT AND TRADEMARK OFFICE
CERTIFICATE OF CORRECTION

PATENT NO. : 6,937,757 B2
APPLICATION NO. : 10/804162
DATED : August 30, 2005
INVENTOR(S) : Ikko Fushiki et al.

It is certified that error appears in the above-identified patent and that said Letters Patent is hereby corrected as shown below:

Title Page;
On the face page, in field (54), in "title", column 1, line 1, delete "XSRGB" and insert -- XsRGB --, therefor.

On the face page, in field (75), in "inventors", column 1, line 6, delete "Eagle, ID" and insert -- Redmond, WA --, therefor.

In column 1, line 1, delete "XSRGB" and insert -- XsRGB --, therefor.

In column 1, line 36 (approx.), delete "This," and insert -- Thus, --, therefor.

In column 12, line 9, delete "tradeoff" and insert -- trade-off --, therefor.

In column 13, line 53, in Claim 4, delete "comprise" and insert -- comprises --, therefor.

In column 14, line 38 (approx.), in Claim 14, delete "comprise" and insert -- comprises --, therefor.

Signed and Sealed this

Fourth Day of August, 2009

JOHN DOLL
*Acting Director of the United States Patent and Trademark Office*